(12) United States Patent
Soon et al.

(10) Patent No.: US 8,553,581 B2
(45) Date of Patent: Oct. 8, 2013

(54) METHOD AND APPARATUS FOR PROVISIONING A NETWORK ELEMENT

(75) Inventors: Yee Ming Soon, Tokyo (JP); Chirayu A. Shah, Fremont, CA (US)

(73) Assignee: Tellabs Operations, Inc., Naperville, IL (US)

( * ) Notice: Subject to any disclaimer, the term of this patent is extended or adjusted under 35 U.S.C. 154(b) by 748 days.

(21) Appl. No.: 12/378,661

(22) Filed: Feb. 17, 2009

(65) Prior Publication Data
US 2010/0208615 A1    Aug. 19, 2010

(51) Int. Cl.
H04L 12/28    (2006.01)
(52) U.S. Cl.
USPC .......................................... 370/254; 370/392
(58) Field of Classification Search
None
See application file for complete search history.

(56) References Cited

U.S. PATENT DOCUMENTS

| 2005/0097203 | A1* | 5/2005 | Unbehagen et al. | 709/223 |
| 2007/0076719 | A1* | 4/2007 | Allan et al. | 370/392 |
| 2007/0097968 | A1* | 5/2007 | Du | 370/389 |
| 2008/0144644 | A1* | 6/2008 | Allan et al. | 370/401 |
| 2008/0170573 | A1* | 7/2008 | Ould-Brahim | 370/392 |

OTHER PUBLICATIONS

Bates, T., et al., "Multiprotocol Extensions for BGP-4", Jun. 2000. http://www.ietf.org/rfc/rfc2858.txt, retrieved from the World Wide Web on Apr. 6, 2009.

Lasserre, M., et al., "Virtual Private LAN Service (VPLS) Using Label Distribution Protocol (LDP) Signaling", Jan. 2007. http://tools.ietf.org/html/rfc4762, retrieved from the World Wide Web on Apr. 6, 2009.
Martini, L., et al., "Encapsulation Methods for Transport of Ethernet over MPLS Networks", Apr. 2006. http://ietf.org/rfc/rfc448.txt, retrieved from the World Wide Web on Apr. 6, 2009.
Sajassi, A., et al., "VPLS Interoperability with Provider Backbone Bridges draft-sajassi-l2vpn-vpls-pbb-interop-02.txt", Nov. 2007. http://tools.ietf.org/html/draft-sajassi-l2vpn- vpls-pbb-interop-02, retrieved from the World Wide Web on Apr. 6, 2008.
Sajassi, Al., et al., "Customer MAC Address Flushing Mechanisms for Provider Backbone Bridging over VPLS draft-sajassi-l2vpn-pbb-vpls-cmac-flush-00.txt", Jul. 2008, retrieved from the World Wide Web on Apr. 6, 2008.

* cited by examiner

Primary Examiner — John Blanton
(74) Attorney, Agent, or Firm — Hamilton, Brook, Smith & Reynolds, P.C.

(57) ABSTRACT

Methods and apparatuses are disclosed for configuring a Provider Backbone Bridge (PBB) interface within Virtual Private LAN Service using Multi-Protocol Border Gateway Protocol (MP-BGP). Previously, the only ways to enable PBB interfaces for transmission were by learning, which poses security and scalability concerns due to flooding, or by manual configuration, which is impractical for large networks. Embodiments of the present invention enable custom topologies to be built in a controlled manner, which has not previously been possible for PBB over VPLS. By using MP-BGP messages to exchange PBB interface information between nodes, peering relationships are established, and communities may be built with any desired topology. Previously, PBB has only been used as a connectionless bridge; embodiments of the present invention use PBB as a connection between edge nodes. Network designers are provided increased flexibility, and security and congestion are improved, benefiting end users.

24 Claims, 8 Drawing Sheets

US 8,553,581 B2

METHOD AND APPARATUS FOR PROVISIONING A NETWORK ELEMENT

BACKGROUND OF THE INVENTION

Modern telecommunications systems employ a variety of technologies to connect nodes across networks. Ethernet (standardized as IEEE 802.3) is a popular data link (OSI Layer 2) technology that is used to create local area networks (LANs). Each node on a LAN is assigned a unique identifier, and Ethernet uses Layer 2 media access control (MAC) addresses for this purpose. In the case of an Ethernet network consisting of a single LAN, all traffic from a given node is broadcast, in the form of data transmission units called frames or packets, to all other nodes. Broadcasting is a simple, yet inefficient, protocol for supporting network communications.

SUMMARY OF THE INVENTION

An embodiment of the invention is a method, or corresponding apparatus, for provisioning a network element. The method includes signaling peer nodes to provision remote interfaces of a connection bridge network inside a Virtual Private LAN Service (VPLS) at the peer nodes. The method further includes provision a logical local interface of the connection bridge network over VPLS, absent normal Ethernet bridging, based on signaling with community attributes received from the peer nodes to enable traffic forwarding via the local interface to peer nodes having common community attributes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF EMBODIMENTS OF THE INVENTION

Figure 1:
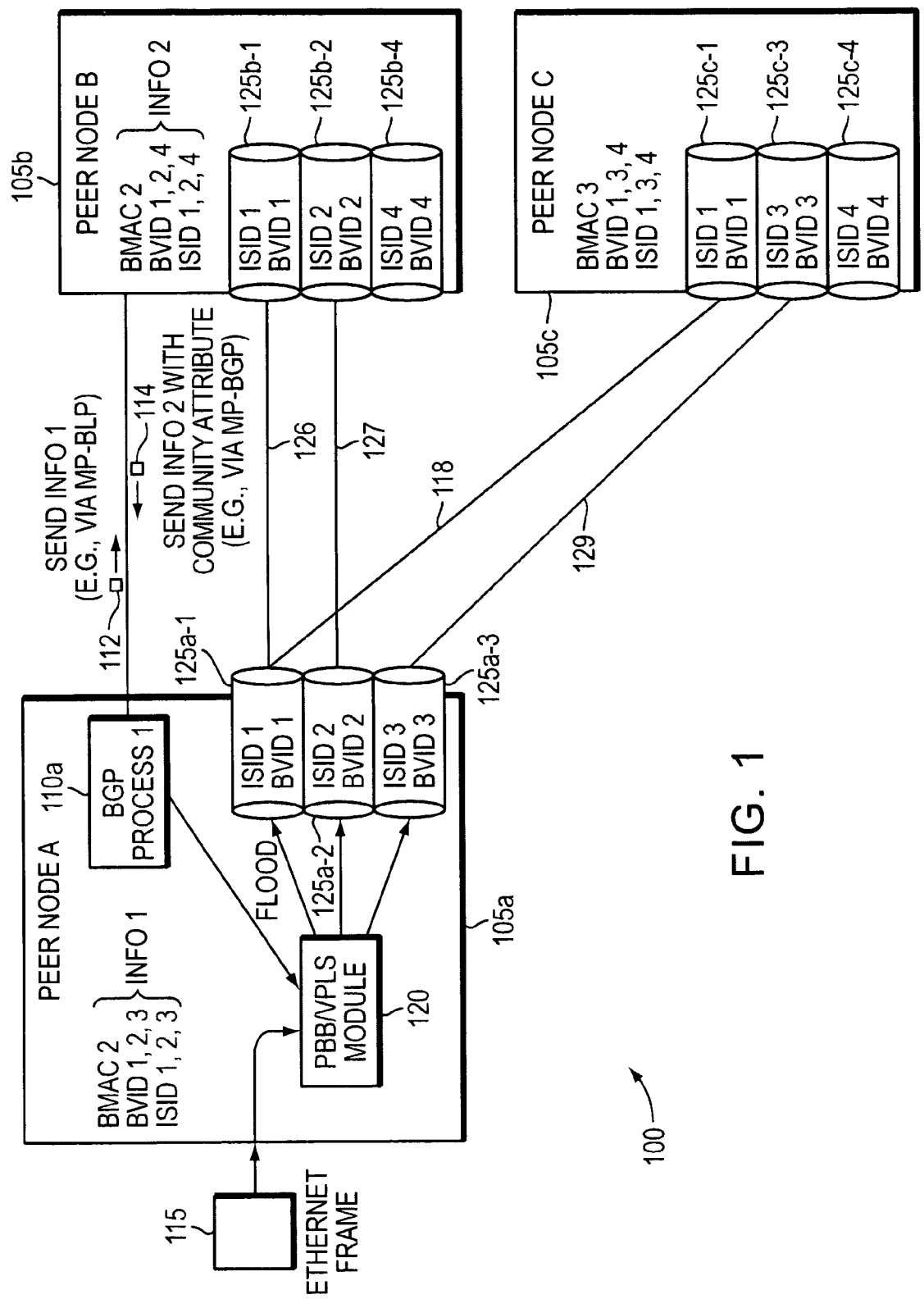
FIG. 1 is a network diagram illustrating peering relationships between peer nodes communicating via PBB over VPLS according to an embodiment of the invention.

A description of example embodiments of the invention follows.

Traditionally, using Provider Backbone Bridge (PBB) over Virtual Private LAN Service (VPLS) (i.e., using PBB tunnels to connect nodes via a VPLS core network; this is also referred to as "PBB over VPLS") requires a full mesh of PBB interfaces. Media Access Control (MAC) addresses are conventionally learned at these interfaces via flooding, which is a slow, nondeterministic process which results in uncontrolled network topologies. Thus, traditionally, addresses may be learned for many nodes to which transmissions are not desired. Furthermore, there is traditionally no control over broadcast and multicast messages. Such flooding related to traditional learning also poses security and scalability issues. To resolve security issues, manual configuration may instead be used, according to conventional technology, to build particular topologies. However, manual configuration, e.g., via a command line interface (CLI), entails an even slower (and more tedious) process, which does not scale well to large networks. For example, traditionally, when a new node joins a group of nodes that can communicate with each other, each of the nodes in the group could be manually configured to enable communication with the new node (the other option is flooding), which is impractical.

Embodiments of the present invention utilize the insight that, instead of learning or manual configuration, automatic provisioning of PBB interfaces is possible in a third, advantageous way. Specifically, without using conventional Ethernet bridging (which entails learning), interfaces of connection bridge networks (e.g., PBB) may be configured to establish peering relationships between nodes based on signaled community attributes. When the term "configure" is used in the context of the presently claimed invention, it is understood that automatic configuring (as in provisioning) via signaling is meant, rather than manual configuring. For example, a community of ten nodes with peering relationships amongst themselves can be formed out of a pool of 10,000 nodes. Through the use of community attributes, the network designer can select, with fine control, the peer nodes with which a given node may communicate. A Layer 2 virtual private network (VPN) of any desired topology can be built, which is not possible with traditional PBB over VPLS. Similar functionality has been available at Layer 3 (routing layer), e.g., with Internet Protocol Virtual Private Networks (IP-VPN), but such control over communities has not previously been technologically possible at Layer 2.

Border Gateway Protocol (BGP) is the core routing protocol of the Internet. Multi-Protocol BGP (MP-BGP), as defined in RFC 2858, is an updated version of BGP that enables the transmission of non-BGP-specific information in some fields. For example, at least one of the two-octet address family identifier (AFI) and the one-octet subsequent address family identifier (SAFI) fields of MP-BGP may be used for this purpose. Embodiments of the invention use at least one of these fields to exchange PBB interface information (e.g., backbone MAC, ISID, and optionally BVID information) between user-facing provider edge (UPE) nodes, e.g., in a process of negotiation. This process is easy to manage, since BGP can be used to remove ISID information. For example, according to one embodiment of the invention, a first UPE can send an update via MP-BGP to a second UPE, indicating that the first UPE does not want to receive traffic associated with a particular ISID anymore. Peering relationships can be established between UPE nodes using the information agreed upon during the MP-BGP negotiation.

Traditionally, PBB has been used as a connectionless bridge. By configuring PBB interfaces, embodiments of the invention use PBB in a new way, i.e., as a connection between two edge nodes (i.e., UPEs). Thus, in embodiments of the invention, PBB is used for a different purpose than its intended one.

In VPLS, a process of automatically discovering pseudowires (PWs) has been available previously. Embodiments of the present invention instead operate at a higher layer of abstraction than prior technologies related to discovering PWs. In particular, embodiments of the present invention provision PBB interfaces. The following networking concepts range from lower to higher layers of abstraction: Ethernet port, VLAN, LSP, PW, PBB interface (connection).

Embodiments of the invention are methods and apparatuses for provisioning a network element, in a network including Provider Backbone Bridge (PBB) over Virtual Private LAN Service (VPLS), using Multiprotocol Border Gateway Protocol (MP-BGP).

An embodiment of the invention is a method, or corresponding apparatus, for configuring a network element. The method includes signaling peer nodes to configure remote interfaces of a connection bridge network inside a Virtual Private LAN Service (VPLS) at the peer nodes. The method further includes configuring a logical local interface of the connection bridge network over VPLS, absent normal Ethernet bridging, based on signaling with community attributes received from the peer nodes to enable traffic forwarding via the local interface to peer nodes having common community attributes.

The connection bridge network may be a Provider Backbone Bridge (PBB) network.

The method may also include negotiating PBB capability with the peer nodes via Multi-Protocol Border Gateway Protocol (MP-BGP), and the configuring may use information agreed upon during the negotiating.

A first Multi-Protocol Border Gateway Protocol (MP-BGP) message may be parsed to identify a virtual switching instance (VSI) on the logical local interface. The remote interfaces may be configured based on the identified VSI on the logical local interface.

Traffic may be transmitted to peer nodes in a network topology at a PBB layer through application of the common community attributes.

The method may also include deleting the configured logical local PBB interface and an association of an ISID value with a VSI corresponding to the logical local PBB interface based on an indication from a peer node that the configured logical local PBB interface and the ISID value should be deleted.

Broadcast, multicast, and unknown unicast messages may be transmitted to known, configured PBB remote interfaces having the common community attributes.

When a logical local PBB interface is newly added, an MP-BGP message may be sent to the remote PBB interface. This MP-BGP message may include an ISID value and an address corresponding to the logical local PBB interface.

Negotiating as described above may include exchanging address family identifier (AFI) information or subsequent address family identifier (SAFI) information with the peer nodes.

The logical local PBB interface over VPLS may include instance service identification (ISID) values, wherein ISID values retrieved from the first MP-BGP message from the logical local PBB interface over VPLS correspond to VSI values on a one-to-one or a many-to-one basis on the logical local PBB interface.

The method may also include deleting the configured logical local PBB interface and the VSI on the logical local PBB interface and sending a second MP-BGP message indicating the deleting to the peer nodes.

A network element corresponding to the above method is another embodiment of the invention.

Before presenting details of the foregoing example embodiments, a brief description of the relevant protocols is presented.

Virtual LANs (VLANs) address some of the efficiency problems of LANs (e.g., high number of traffic collisions) by segmenting a single Ethernet LAN into multiple broadcast domains, with each frame tagged with a VLAN identifier according to the IEEE 802.1Q standard. A switch (also known as a bridge) serves as the boundary between broadcast domains, forwarding traffic destined for nodes in a different broadcast domain and filtering (not forwarding) traffic destined for nodes in the same broadcast domain. When first connected to an Ethernet VLAN, a switch has no knowledge of the MAC addresses of nodes on the network. Each switch monitors network traffic, and for each detected packet, the switch adds the MAC source address of the sending node, as well as the port (interface) on which the address was learned, to the switch's Ethernet switching table.

If a packet received by a switch has a destination MAC address corresponding to an entry in the switching table, the switch forwards or filters the packet accordingly. If the destination address is not in the switching table, the switch floods the packet on all outgoing interfaces except the interface on which the packet was received (or on all outgoing interfaces if the traffic originated at the switch). Eventually, one of the flooded packets will reach the intended destination node, which will then reply to the switch so that that node's address may be added to the switching table. This process is known as MAC address learning.

MAC address learning poses scalability issues as the number of customer MAC addresses increases. This is because the broadcast transmissions that accompany MAC address learning result in nondeterministic behavior throughout the network and may result in network slowdowns. 802.1Q VLANs also suffer from a scalability problem related to the VLAN tag (or ID). Since this tag, which is used to identify customer service instances, is 12 bits, only 4094 (i.e., $2^{12}$) service instances are possible (since VLAN ID values of 0 and 4095 are reserved).

In response to these scalability concern, a technique called Provider Backbone Bridge (PBB) has been developed and standardized as IEEE 802.1ah. In the PBB architecture, customer networks are aggregated (into aggregation networks) and then connected to provider core networks for transmission across a core backbone. PBB adds the following fields to an Ethernet frame: 1) backbone destination MAC address (B-DMAC); 2) backbone source MAC address (B-SMAC); 3) backbone tag (B-tag); and 4) Instance tag (I-tag). The B-DMAC and B-SMAC fields effectively hide customer MAC addresses in a network core, since only backbone addresses will be visible to core network elements for forwarding and learning. This technique is known as MAC-in-MAC encapsulation and substantially reduces the number of MAC addresses the core network elements have to learn and to which traffic must be forwarded.

Since the I-tag includes a 24-bit service identifier (ISID) identifying a service customer, PBB allows for much more scalability than 802.1Q in terms of the number of service instances (2^24, or about 16 million) that may be accommodated. Furthermore, since PBB identifies backbone VLANs through a backbone VLAN ID (BVID) which is part of the B-tag and thus separate from the ISIDs, PBB segregates customer services and provider VLANs. This offers network designers the flexibility to choose network topologies (e.g., the number of VLANs) independently of the customer service instances that must be supported.

Multi-Protocol Label Switching (MPLS) is a technology that has gained favor for use in core networks. In an MPLS network, routers do not need to consult IP routing tables, which may impose memory limitations, to determine where to forward incoming traffic. Rather, MPLS establishes fixed paths known as label-switched paths (LSPs) from one end of the network to another. Routers in the MPLS network check a label and destination associated with the packet and send the packet to the next router on the fixed path (including the present router) corresponding to the label.

MPLS may be used to implement Virtual Private LAN Service (VPLS), which is a Layer 2 service that emulates LAN service across a large region such as a Wide Area Network (WAN) or a Metropolitan Area Network (MAN). MPLS enables construction of label switched paths (LSPs), and VPLS makes it possible to interconnect LAN segments over a packet switch network using LSPs and makes the remote LAN segments behave as a single LAN. A VPLS is composed of Virtual Switching Instances (VSIs), which serve as nodes, and pseudowire (PW) tunnels, which serve as edges. Ethernet packets are forwarded by a VSI to the appropriate PW tunnel for transport across the VPLS network.

FIG. 1 is a network diagram illustrating peering relationships between peer nodes communicating via PBB over VPLS according to an embodiment of the invention. Peer nodes A, B and C 105*a-c* have backbone MAC addresses B-MAC 1, B-MAC 2 and B-MAC 3, respectively. In addition, each peer node has outgoing links, with each link characterized by an instance service ID (ISID), which identifies a customer service instance, and a backbone VLAN identifier (BVID). When a logical local interface at peer node A is newly added, BGP process 1 110*a* signals to peer nodes, such as peer node B 105, to configure remote interfaces of a connection bridge network over VPLS at the peer nodes. This is accomplished by sending a signal 112 which includes, in this example, B-MAC, BVID and ISID information related to peer node A. This information may be sent via an MP-BGP message using the AFI and SAFI fields.

Peer node B 105*b* parses the received MP-BGP message to identify a VSI on the logical local interface and configures a remote interface at peer node B 105*b* based on the identified VSI. Peer node B 105*b* then sends a signal 114 back to peer node A with corresponding information related to peer node B 105*b*, including community attributes. The signal 114 may be sent via MP-BGP using the AFI and SAFI fields to specify type-length-value (TLV) information that conveys community attributes. Members of a community know how to interpret community attributes in a common manner. Thus, common community attributes allow members of a community to interface (e.g., at the PBB layer) and communicate with one another in a network topology.

Based on the signaling 114, peer node A 105*a* configures its logical local interface, without using normal Ethernet bridging, to enable traffic forwarding via the local interface to peer nodes (such as peer node B) having common community attributes. Such traffic may include broadcast, multicast, and unknown unicast messages sent to known, configured PBB remote interfaces having the common community attributes.

The logical local interface at peer node A 105*a* includes information pertaining to the node at the remote end of the interface, i.e., peer node B 105*b*. After this configuration is complete, an incoming Ethernet frame 115 received by peer node A 105*a* is flooded by a PBB-VPLS module 120 across all outgoing ISID/BVID interfaces 125*a*-1, 125*a*-2, and 125*a*-3.

Frames are sent to those remote interfaces which have previously been configured to receive such information. For example, in the example described above, two (or more) links 126 and 127 may be used to couple ISID/BVID interfaces 125*a*-1 and 125*a*-2 with corresponding interfaces ISID/BVID 125*b*-1 and 125*b*-2, respectively. Peer node B 105*b*, which has an interface 125*b*-4 with ISID 4 and BVID 4 but no interface with ISID 3 and BVID 3, does not receive messages sent from peer node A 105*a*. Assuming peer node C 105*c* is appropriately configured as illustrated in FIG. 1, peer node C 105*c* can receive messages on links 128 and 129 to interfaces for ISID 1/BVID 1 and ISID 3/BVID 3, respectively. In this way, a community topology is built up by explicitly configuring (provisioning) interfaces using MP-BGP and specifically by using common community attributes.

Figure 2:
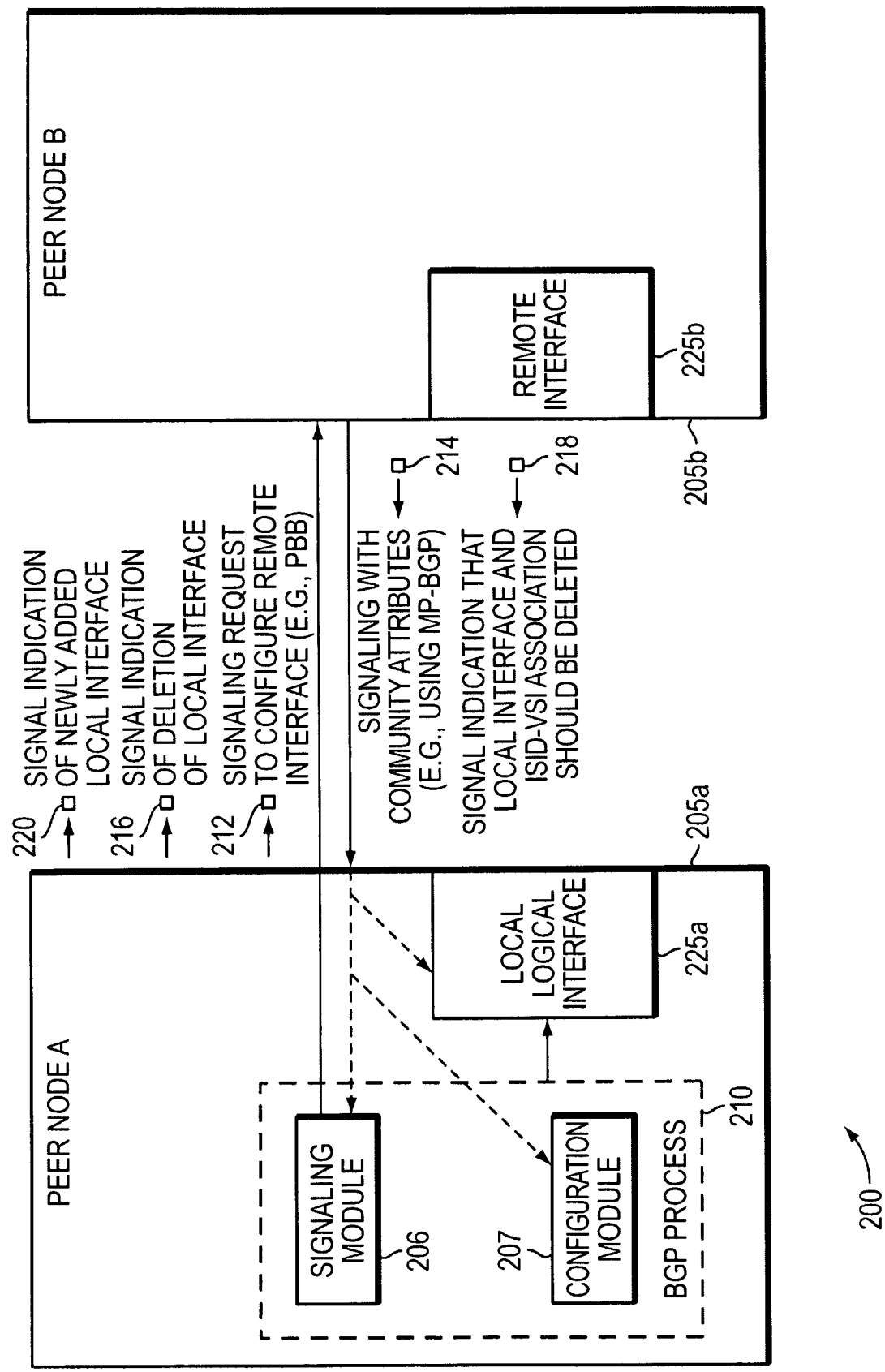
FIG. 2 is a block diagram illustrating peer nodes communicating via PBB over VPLS according to an embodiment of the invention.

FIG. 2 is a block diagram illustrating peer nodes communicating via PBB over VPLS according to an embodiment of the invention. A BGP process 210 at peer node A 205*a* includes a signaling module 206 and a configuration module 207. The signaling module 206 signals a request 212 to configure a remote interface 225*b* at peer node B 205*b*. This remote interface may be a PBB interface. In response, peer node B sends a signal 214 with community attributes, e.g., using MP-BGP, to peer node A 205*a*. Based on this received signaling, the configuration module 207 configures a local interface 225*a* of peer node A 205*a*. In this way, a peering relationship between peer node A 205*a* and peer node B 205*b* is established.

In alternative embodiments, signaling between peer node A 205*a* and peer node B 205*b* is used for other purposes than configuring (provisioning) interfaces at the respective peer nodes. For example, In an event the local interface 255*a* at peer node A 205*a* is deleted, signaling (e.g., using community attributes via an MP-BGP message) is used to inform peer nodes (e.g., peer node B 205*b*) of the deletion (216). In another example, peer node B 205*b* signals an indication (218) that the local interface 225*a* and an association between an ISID and a VSI corresponding to the local interface 225*a* should be deleted. Upon receiving signal 218, peer node A 205*a* performs the required deletion. In another example, peer node A 205*a* signals (220) to peer node B indicating that the local interface 225*a* has been newly added. In this example, the indication 220 includes an ISID value and an address corresponding to the newly added local interface 225*a*.

Figure 3:
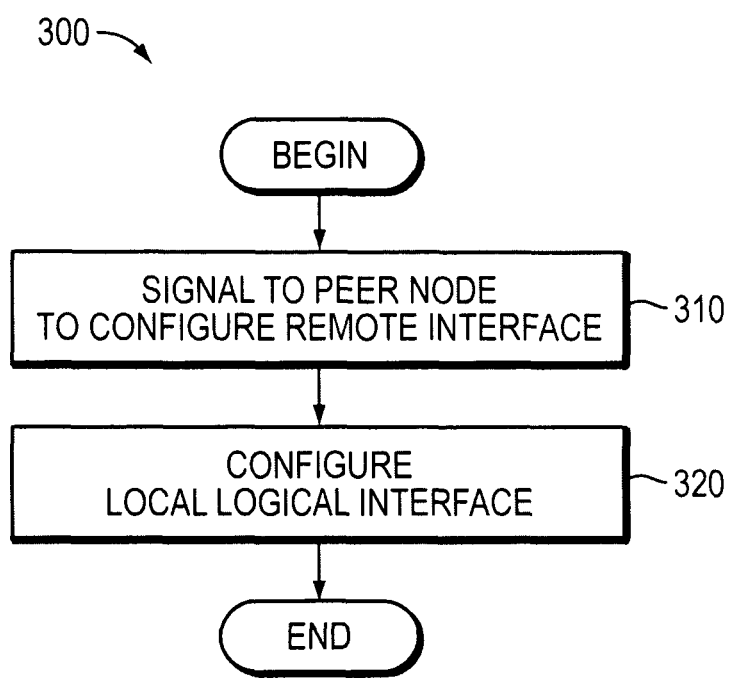
FIG. 3 is a flow diagram of a process performed at a peer node according to an embodiment of the invention.

FIG. 3 is a flow diagram 300 performed at a peer node according to an embodiment of the invention. The UPE signals to a peer node to configure (310) a remote interface. The UPE configures (320) a logical local interface based on received signaling including community attributes.

Figure 4:
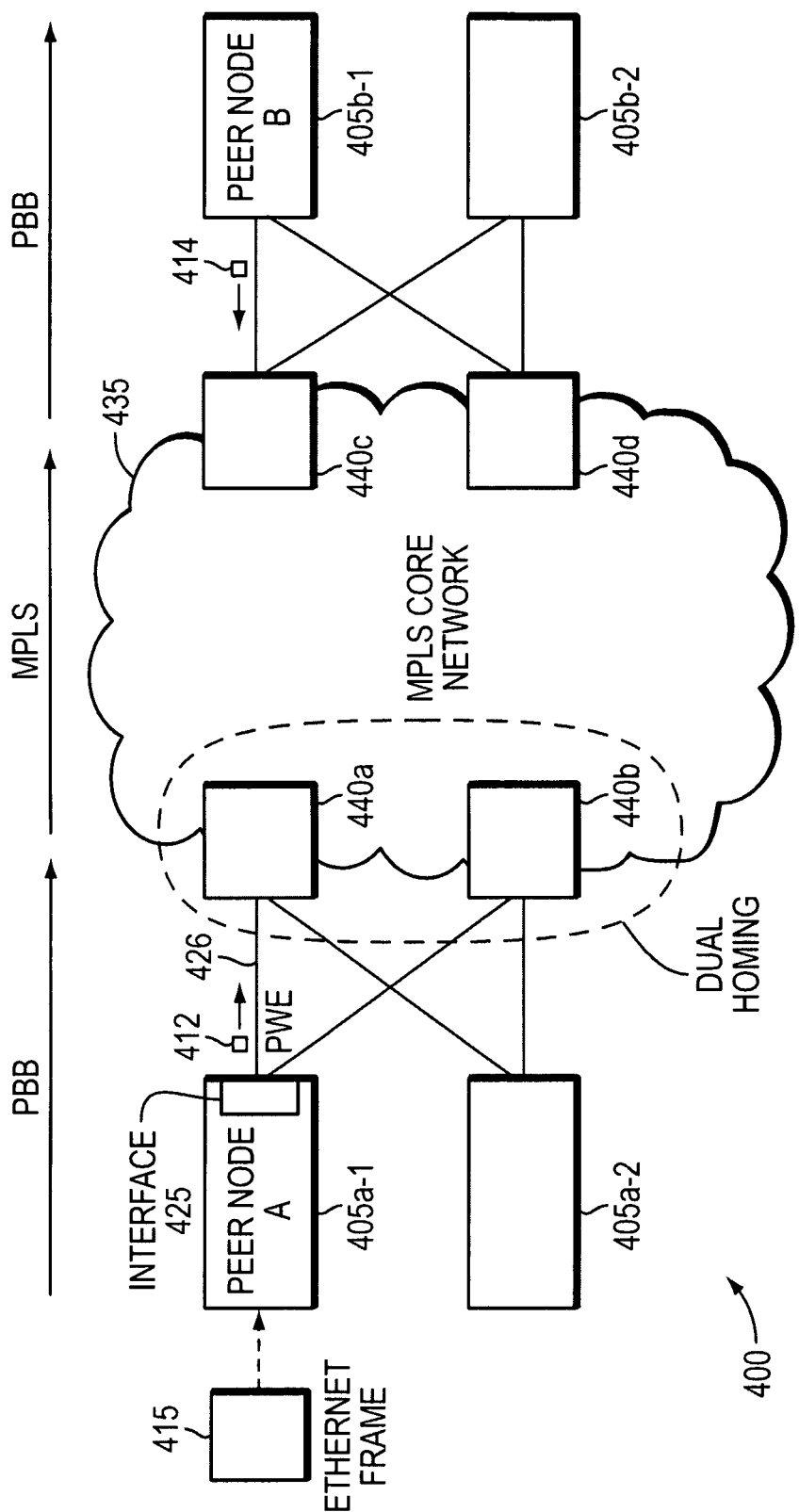
FIG. 4 is a network diagram illustrating an example network topology in which embodiments of the invention may be implemented.

FIG. 4 is a network diagram illustrating an example network topology in which embodiments of the invention may be implemented. In a network 400, peer nodes 405*a*-1 and 405*a*-2 are connected via a dual homing configuration to network-facing provider edge (NPE) nodes (NPE) 440*a-b* of an MPLS core network 435. It should be understood that peer nodes are UPE nodes in this context. On the other side of the core network 435, a similar relationship exists between NPE nodes 440*c-d* and peer nodes 405*b*-1 and 405*b*-2. An Ethernet frame 415 that is received by peer node A 405*a*-1 is sent via interface 425, including pseudowires (PWs), such as PW 426, to peer node B 405*b*-1. PBB encapsulation is used between peer node A 405*a*-1 and network-facing provider edge (NPE) node 440*a*, and MPLS encapsulation is used within the MPLS core network 435. PBB encapsulation is used on the other side of the core network 435 to reach peer node 405*b*-1. Signals 412 and 414 are exchanged to establish the peering relationship. After this initial control setup, well-known techniques according to hierarchical virtual private LAN service (H-VPLS) may subsequently be used to transmit data between peer node A 405*a*-1 and peer node B 405*b*-1.

Figure 5:
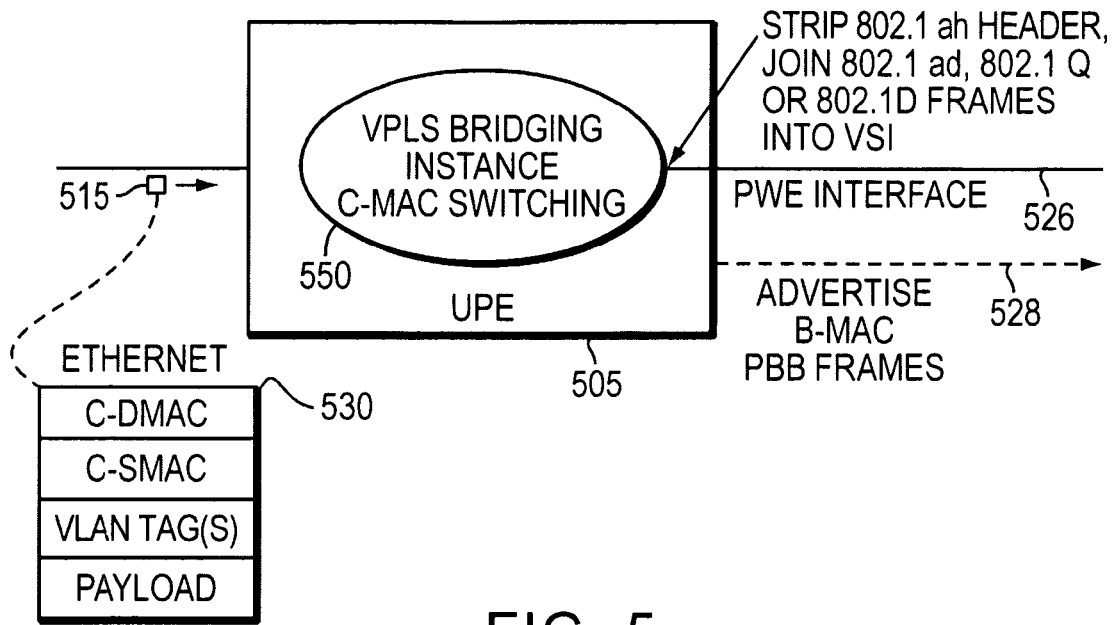
FIG. 5 is a block diagram of a user-facing provider edge (UPE) node according to an embodiment of the invention.

FIG. 5 is a block diagram of a user-facing provider edge (UPE) node 505 according to an embodiment of the invention. The UPE 505 includes a VSI 550, and the UPE node 505 switches based on customer MAC addresses. The UPE node 505 receives an incoming frame 515 having Ethernet format 530, strips incoming 802.1ah headers and joins 802.1ad, 802.1Q or 802.1D frames into VSIs, e.g., VSI 550, for transmission on an outgoing pseudowire emulation (PWE) interface 526. PWE is also referred to as Pseudowire Emulation Edge-to-Edge (PWE3) in this context, and it emulates a point-to-point connection over a packet-switched network. The terms PW, PWE, and PWE3 may be used interchangeably in the context of the present invention. The UPE 505 advertises B-MAC addresses and sends outgoing PBB frames 528.

Figure 6:
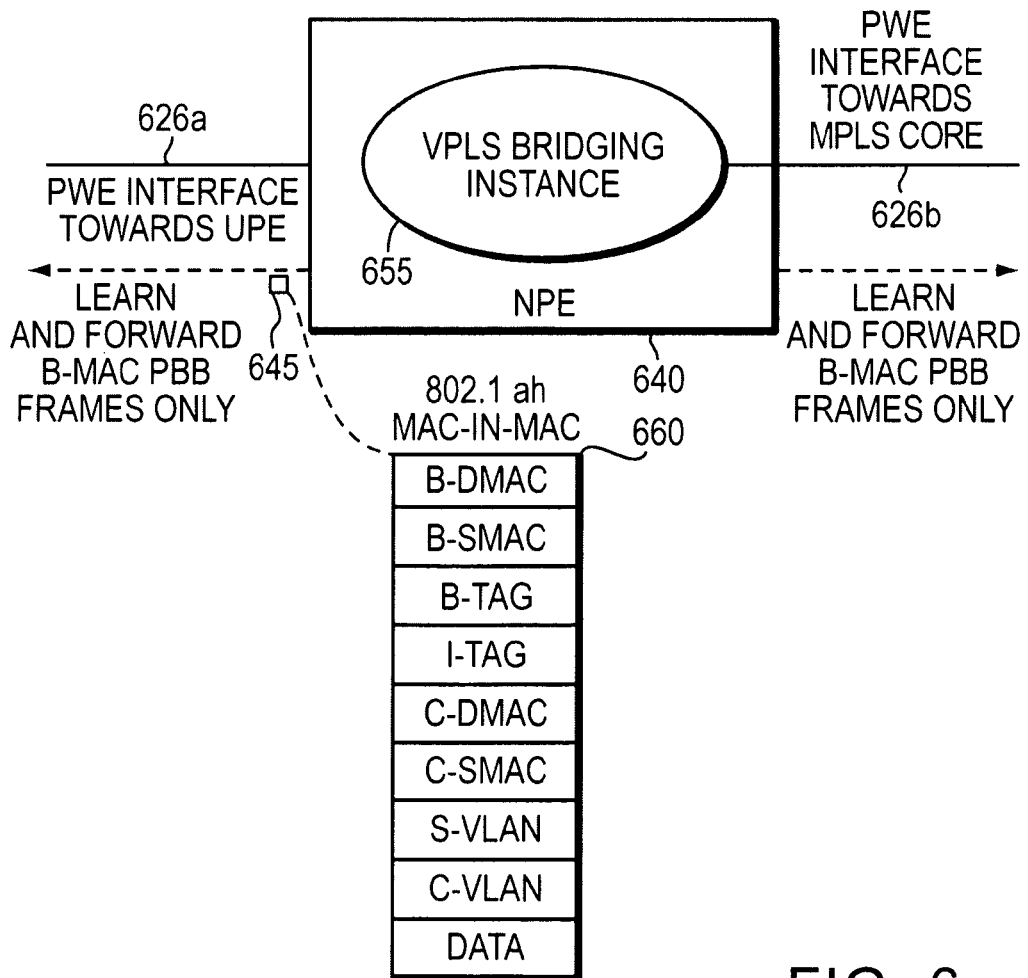
FIG. 6 is a block diagram of a network-facing provider edge (NPE) node according to an embodiment of the invention.

FIG. 6 is a block diagram of a network-facing provider edge (NPE) node 640 according to an embodiment of the invention. The NPE 640 includes incoming and outgoing PWE interfaces 626*a* and 626*b*, respectively, as well as a VSI 655. The NPE 640 learns and forwards B-MAC addresses on the incoming and outgoing interfaces 626*a*-*b* as shown by a PBB format 660 for a packet (frame) 645.

Figure 7:
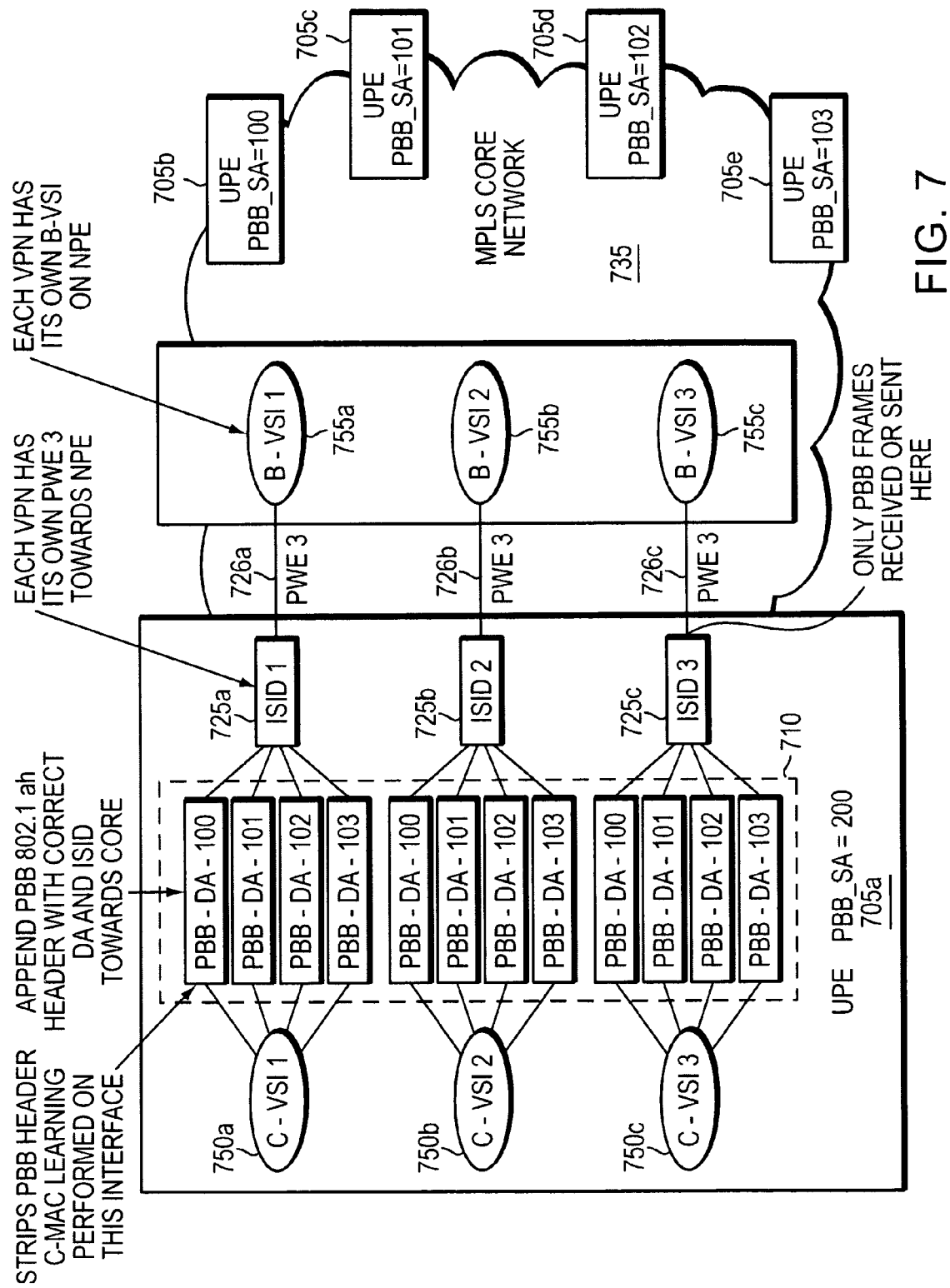
FIG. 7 is a network diagram illustrating PBB interface configuration according to an embodiment of the invention.

FIG. 7 is a network diagram illustrating a PBB interface configuration according to an embodiment of the invention. FIG. 7 shows a UPE node 705*a*, an NPE node 740 (part of MPLS core network 735), and UPE nodes 705*b*-*e*. In this example, the addresses of UPE nodes 705*a*-*e* are 200, 100, 101, 102 and 103, respectively. One example UPE 705*a*, with interior high level details shown, includes customer VSIs (C-VSIs) 750*a*, *b*, and *c*, which use PBB interface 710 to send frames associated with different customer services (ISID 1 725*a*, ISID 2 725*b*, and ISID 3 725*c*) on different PWE interfaces (726*a*, 726*b*, and 726*c*, respectively). In this example UPE 705*a*, which includes three VPNs, each VPN has its own PWE interface towards the NPE 740, and each VPN has its own backbone VSI (755*a*, 755*b*, and 755*c*) on the NPE 740. In this embodiment, a different VSI may be used for each customer. The example detailed UPE 705*a* strips incoming PBB headers and learns customer MAC addresses on PBB interface 710, which is configured by MP-BGP. The example UPE 705*a* sends traffic to peer nodes 705*b*-705*e*. On egress, the UPE 705*a* appends a PBB header with the correct destination address and ISID towards the MPLS core 735, and PBB frames (not shown) are sent via the PWE interfaces 726*a*-*c*.

Figure 8:
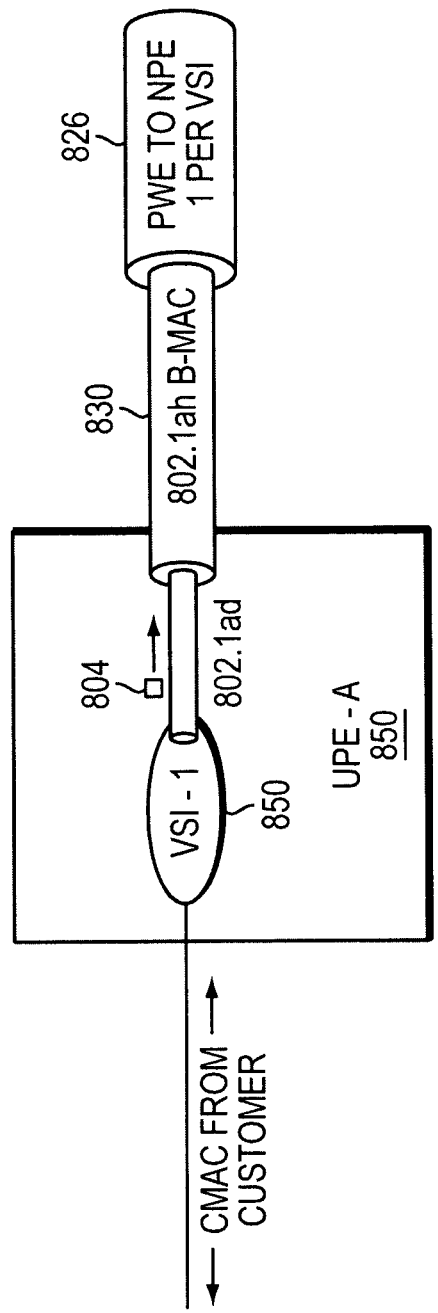
FIG. 8 is a network diagram providing a magnified view of PBB interface configuration according to an embodiment of the invention.

FIG. 8 is a network diagram providing a magnified view of a PBB interface configuration according to an embodiment of the invention. This diagram illustrates hierarchical or nested interfaces that plug into a virtual switching instance. Traditionally, customer MAC (CMAC) addresses are learned dynamically over 802.1ah PBB interfaces. In the example embodiment of the invention as shown in FIG. 8, the PBB interfaces are instead provisioned using MP-BGP. A UPE 805 includes a VSI 850, which sends an 802.1ad user payload frame 804, via a PBB logical interface 830, which is coupled to a PWE interface 826 to an NPE.

Figure 9:
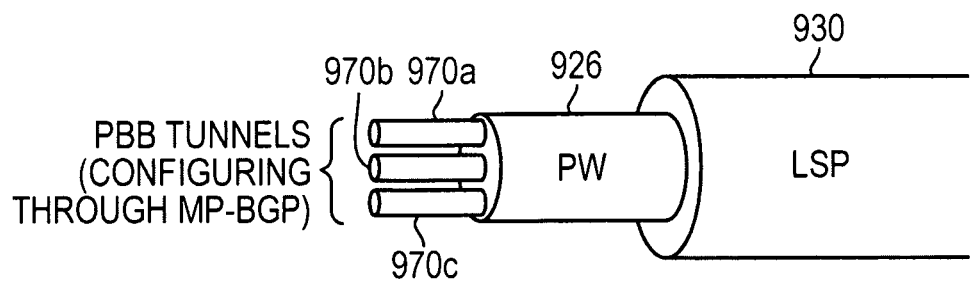
FIG. 9 is an interface diagram illustrating the use of PBB tunnels as a connection according to an embodiment of the present invention.

FIG. 9 is an interface diagram illustrating the use of PBB tunnels as a connection according to an embodiment of the present invention. A label switched path (LSP) 930 is used to connect UPE nodes. The LSP 930 includes one or more pseudowires (PW 926 in this example), which, in turn, include PBB tunnels 970*a*, 970*b*, and 970*c*, whose interfaces may be configured through MP-BGP. Thus, in contrast to the traditional use of PBB as a connectionless bridge, embodiments of the present invention use PBB as a connection between edge nodes, the connection being configurable via MP-BGP.

Figure 10:
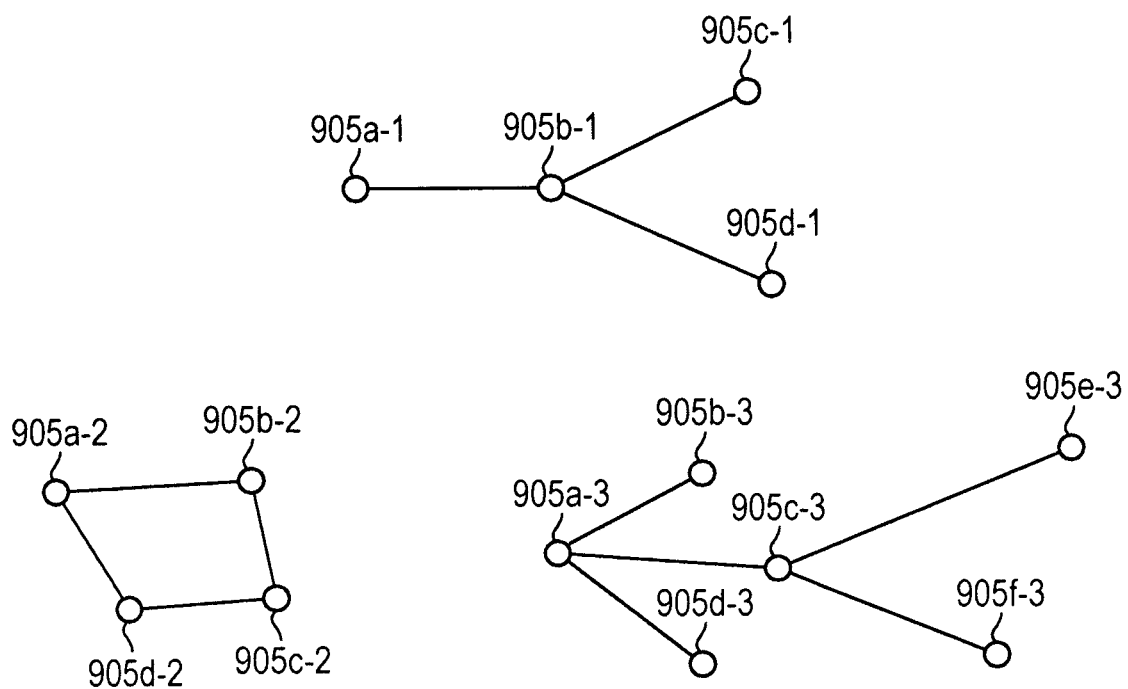
FIG. 10 is a topology diagram illustrating exemplary community topologies which may be established in accordance with embodiments of the invention.

FIG. 10 is a topology diagram illustrating exemplary community topologies which may be established in accordance with embodiments of the invention. Nodes 905*a*-1 through 905*d*-1 form a star topology that may be used for UPE peer nodes in a community. Nodes 905*a*-2 through 905*d*-2 form a ring topology, and nodes 905*a*-3 through 905*f*-3 form a tree topology. Other topologies (e.g., hub/spoke, headquarters/branch office) may be used as well to form communities.

Embodiments or aspects of the invention may be implemented in hardware, firmware, or software. if implemented in software, the software may be implemented in any software language capable of performing the embodiment(s) of the invention. The software may be stored on any computer-readable medium, such as RAM, ROM, CD-ROM, and so forth. The software includes instructions that can be loaded and executed by a general purpose or application specific processor capable of supporting embodiment(s) of the invention.

While this invention has been particularly shown and described with references to example embodiments thereof, it will be understood by those skilled in the art that various changes in form and details may be made therein without departing from the scope of the invention encompassed by the appended claims.

For example, with respect to FIG. 7, in alternative embodiments (not shown in FIG. 7), one VSI at an NPE handles traffic from all VSIs at a UPE, connecting multiple ISIDs to a backbone VSI (B-VSI) either via different pseudowires or via a single pseudowire. In other words, in an "N:1" configuration, multiple C-VSI's map to a single B-VSI, using one ISID per VSI.

In another example, with respect to FIG. 8, in some embodiments, one PWE interface may be associated with one backbone VSI at an NPE (shown in FIG. 8); in other embodiments, more than PWE interface is associated with one backbone VSI at an NPE (not shown in FIG. 8).

What is claimed is:

1. A method of provisioning a network element, the method comprising:
    signaling from a given node to peer nodes to configure remote interfaces of a connection bridge network inside a Virtual Private LAN Service (VPLS) at the peer nodes, the remote interfaces being interfaces of the peer nodes; and
    configuring a logical local interface of the given node and of the connection bridge network over VPLS, absent normal Ethernet bridging, based on signaling with community attributes received from the peer nodes to enable traffic forwarding via the logical local interface to peer nodes having common community attributes.

2. The method of claim 1, wherein the connection bridge network is a Provider Backbone Bridge (PBB) network.

3. The method of claim 2, further including negotiating PBB capability with the peer nodes via Multi-Protocol Border Gateway Protocol (MP-BGP), and wherein the configuring uses information agreed upon during the negotiating.

4. The method of claim 3, wherein negotiating includes exchanging at least one of address family identifier (AFI) and subsequent address family identifier (SAFI) information with the peer nodes.

5. The method of claim 2, further including parsing a first Multi-Protocol Border Gateway Protocol (MP-BGP) message to identify a virtual switching instance (VSI) on the logical local interface, and wherein the remote interfaces are configured based on the identified VSI on the logical local interface.

6. The method of claim 5, wherein the local PBB interface over VPLS includes instance service identification (ISID) values, wherein ISID values retrieved from the first MP-BGP message from the local PBB interface over VPLS correspond to VSI values on a one-to-one basis on the local PBB interface.

7. The method of claim 5, wherein the logical local PBB interface over VPLS includes instance service identification (ISID) values, wherein ISID values retrieved from the first MP-BGP message from the logical local PBB interface over VPLS correspond to VSI values on a many-to-one basis on the local PBB interface.

8. The method of claim 5, further including:
deleting the configured logical local PBB interface and the VSI on the logical local PBB interface; and
sending a second MP-BGP message indicating the deleting to the peer nodes.

9. The method of claim 2, further including transmitting traffic to peer nodes in a network topology at a PBB layer through application of the common community attributes.

10. The method of claim 2, further including deleting the configured logical local PBB interface and an association of an ISID value with a VSI corresponding to the logical local PBB interface based on an indication from a peer node that the configured local PBB interface and the ISID value should be deleted.

11. The method of claim 2, further including transmitting broadcast, multicast, and unknown unicast messages to known, configured PBB remote interfaces having the common community attributes.

12. The method of claim 2, further including:
in an event the local PBB interface is newly added, sending to the remote PBB interface an MP-BGP message including an ISID value and an address corresponding to the logical local PBB interface.

13. An apparatus for provisioning a network element, the apparatus comprising:
a signaling module to signal from a given node to peer nodes to configure remote interfaces of a connection bridge network inside a Virtual Private LAN Service (VPLS) at the peer nodes, the remote interfaces being interfaces of the peer nodes; and
a configuration module to configure a logical local interface of the given node and of the connection bridge network over VPLS, absent normal Ethernet bridging, based on signaling with community attributes received from the peer nodes to enable traffic forwarding via the local interface to peer nodes having common community attributes.

14. The apparatus of claim 13, wherein the connection bridge network is a Provider Backbone Bridge (PBB) network.

15. The apparatus of claim 14, further including a negotiating module to negotiate PBB capability with the peer nodes via Multi-Protocol Border Gateway Protocol (MP-BGP), and wherein the network element is configured using information agreed upon during the negotiating.

16. The apparatus of claim 15, wherein the negotiating module negotiates PBB capability using an exchange of at least one of address family identifier (AFI) and subsequent address family identifier (SAFI) information with the peer nodes.

17. The apparatus of claim 14, further including a parsing module to parse a first Multi-Protocol Border Gateway Protocol (MP-BGP) message to identify a virtual switching instance (VSI) on the logical local interface, the identified VSI used to configure the remote interfaces of the connection bridge network.

18. The apparatus of claim 17, wherein the logical local PBB interface over VPLS includes instance service identification (ISID) values, wherein ISID values retrieved from the first MP-BGP message from the local PBB interface over VPLS correspond to VSI values on a one-to-one basis on the local PBB interface.

19. The apparatus of claim 17, wherein the local PBB interface over VPLS includes instance service identification (ISID) values, wherein ISID values retrieved from the first MP-BGP message from the logical local PBB interface over VPLS correspond to VSI values on a many-to-one basis on the local PBB interface.

20. The apparatus of claim 17, further including:
a deletion module to delete the configured logical local PBB interface and the VSI on the local PBB interface; and
a deletion notification module to sending a second MP-BGP message indicating the deleting to the peer nodes.

21. The apparatus of claim 14, further including a transmitting module to transmit traffic to peer nodes in a network topology at a PBB layer through application of the common community attributes.

22. The apparatus of claim 14, further including a deletion module to delete the configured logical local PBB interface and an association of an ISID value with a VSI corresponding to the local PBB interface based on an indication from a peer node that the configured logical local PBB interface and the ISID value should be deleted.

23. The apparatus of claim 14, further including a community transmission module to transmit broadcast, multicast, and unknown unicast messages to known, configured PBB remote interfaces having the common community attributes.

24. The apparatus of claim 14, further including an addition notification module configured to send to the remote PBB interface, in an event the logical local PBB interface is newly added, an MP-BGP message including an ISID value and an address corresponding to the logical local PBB interface.

* * * * *